US012479474B2

(12) United States Patent
Abdulkhaleq et al.

(10) Patent No.: US 12,479,474 B2
(45) Date of Patent: Nov. 25, 2025

(54) METHOD FOR ASCERTAINING A SAFETY LEVEL OF A SETPOINT FUNCTION OF A VEHICLE, SAFETY SYSTEM AND VEHICLE

(71) Applicant: Robert Bosch GmbH, Stuttgart (DE)

(72) Inventors: Asim Abdulkhaleq, Ditzingen (DE); Brahim Baqasse, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 202 days.

(21) Appl. No.: 17/606,334

(22) PCT Filed: Mar. 25, 2020

(86) PCT No.: PCT/EP2020/058302
§ 371 (c)(1),
(2) Date: Oct. 25, 2021

(87) PCT Pub. No.: WO2020/216562
PCT Pub. Date: Oct. 29, 2020

(65) Prior Publication Data
US 2022/0219733 A1    Jul. 14, 2022

(30) Foreign Application Priority Data

Apr. 26, 2019   (DE) .................... 10 2019 206 026.9

(51) Int. Cl.
*B60W 60/00*   (2020.01)
*B60W 40/09*   (2012.01)
(Continued)

(52) U.S. Cl.
CPC ........ *B60W 60/0018* (2020.02); *B60W 40/09* (2013.01); *B60W 50/082* (2013.01);
(Continued)

(58) Field of Classification Search
CPC ............. B60W 60/0018; B60W 40/09; B60W 50/082; B60W 50/14; B60W 2050/146; B60W 2420/42; G06N 20/00
(Continued)

(56) References Cited

U.S. PATENT DOCUMENTS 8,457,827 B1 *   6/2013   Ferguson ............... B60W 30/16
                                                                701/28
2020/0026302 A1 *   1/2020   Wolcott ................ G06F 18/251
(Continued)

FOREIGN PATENT DOCUMENTS

CN         103946897 A    7/2014
DE         19821163 A1    11/1999
(Continued)

OTHER PUBLICATIONS

English Translation for DE-102016219122-A1 (Year: 2023).*
(Continued)

*Primary Examiner* — Mahmoud S Ismail
(74) *Attorney, Agent, or Firm* — NORTON ROSE FULBRIGHT US LLP (57) ABSTRACT

A method for ascertaining a safety level of a setpoint function of a vehicle. The method includes: detecting an environment of the vehicle and/or a state of the environment with the aid of at least one environment sensor, the environment sensor generating a first sensor signal which represents the detected partial region of the environment and/or the detected state of the environment; detecting a movement variable of the vehicle with the aid of at least one movement sensor, the movement sensor generating a second sensor signal which represents the detected movement variable; and ascertaining the safety level of the setpoint function of the
(Continued)

vehicle as a function of the generated first sensor signal and the generated second sensor signal with the aid of a safety system.

16 Claims, 2 Drawing Sheets

(51) Int. Cl.
*B60W 50/08* (2020.01)
*B60W 50/14* (2020.01)
*G06N 20/00* (2019.01)

(52) U.S. Cl.
CPC ....... *B60W 50/14* (2013.01); *B60W 2050/146* (2013.01); *B60W 2420/403* (2013.01); *G06N 20/00* (2019.01)

(58) Field of Classification Search
USPC .......................................................... 701/23
See application file for complete search history.

(56) References Cited

U.S. PATENT DOCUMENTS

| | | | | |
|---|---|---|---|---|
| 2021/0124327 | A1* | 4/2021 | Parfitt | H01R 13/7137 |
| 2022/0080958 | A1* | 3/2022 | Song | G06V 10/147 |
| 2022/0212659 | A1* | 7/2022 | Ihlenburg | B60W 50/14 |
| 2022/0215508 | A9* | 7/2022 | Harrison | G06V 20/56 |
| 2023/0168685 | A1* | 6/2023 | Calleija | G08G 1/09623 |
| | | | | 701/28 |

FOREIGN PATENT DOCUMENTS

| | | | | |
|---|---|---|---|---|
| DE | 102012211838 | A1 | 1/2013 | |
| DE | 102013205392 | A1 | 10/2014 | |
| DE | 102016219122 | A1 * | 4/2018 | |
| EP | 2314490 | A1 | 4/2011 | |
| EP | 2604478 | A1 | 6/2013 | |
| EP | 2921362 | A1 | 9/2015 | |
| EP | 2922033 | A1 | 9/2015 | |
| EP | 2604478 | B1 * | 1/2018 | ......... B60R 16/0232 |
| WO | 2018114808 | A1 | 6/2018 | |

OTHER PUBLICATIONS

English Translation for EP-2604478-B1 (Year: 2023).*
International Search Report for PCT/EP2020/058302, Issued Jul. 16, 2020.
ISO 26262-1 Road Vehicles—Functional Safety—Part 1: Vocabulary, 2018, pp. 1-42.
ISO 26262-3 Road Vehicles—Functional Safety—Part 3: Concept Phase, 2018, pp. 1-38.
ISO/PAS 21448 Road Vehicles—Safety of the Intended Functionality, 2019, pp. 1-64.
Zhou Min: "Informatization Engineering in Manufacturing," Metallurgical Industry Press, China, (2017), pp. 240-241, with English Summary of Content.

* cited by examiner

ମETHOD FOR ASCERTAINING A SAFETY LEVEL OF A SETPOINT FUNCTION OF A VEHICLE, SAFETY SYSTEM AND VEHICLE

CROSS-REFERENCE TO RELATED APPLICATIONS

The present application is a national phase of International Patent Application No. PCT/EP2020/058302 filed on Mar. 25, 2020, which claims priority under 35 U.S.C. § 119 of German Patent Application No. 10 2019 206 026.9 filed on Apr. 26, 2019, the content of all of which are hereby incorporated by reference in their entireties.

The present invention relates to a method for ascertaining a safety level of a setpoint function of a vehicle and to a safety system that is set up to carry out the method according to the present invention. In addition, the present invention relates to a computer program which is set up to carry out the method according to the present invention. The present invention also relates to a vehicle equipped with the safety system.

BACKGROUND INFORMATION

At present, driver assistance systems assist a driver of a vehicle, typically during a parking operation and/or in maintaining a safe distance from a vehicle driving ahead, and/or in the control of the vehicle inside a traffic lane. A semiautomatic or fully automatic control of a vehicle is envisioned in the future, in particular when driving on a superhighway. In principle, a semiautomatic or fully automatic control or guidance of a vehicle provides greater safety in comparison with a vehicle that is manually controlled by a driver because a detection of the environment of the vehicle is carried out without interruption and entirely with the aid of an electrical and/or electronic system of the vehicle. In other words, a detection of an area of the environment of a vehicle by a driver is always restricted or limited in comparison with a complex electronic system for detecting the environment. In addition, a detection by the driver is never uninterrupted because the driver may turn his gaze toward operating instruments of the vehicle, for instance. As a result, the semiautomatic or fully automatic control of a vehicle basically increases the safety of occupants of a vehicle. In addition, the semiautomatic or fully automatic control of a vehicle considerably increases the comfort of the occupants, in particular of the driver. For instance, an automatic control allows an occupant to use the driving time more meaningfully. However, a semiautomatic of fully automatic control has to be safe for the driver and the occupants of the vehicle.

ISO 26262-1 defines the vehicle safety as the absence of risks that result from malfunctions of an electrical and/or electronic system. The ISO 26262-3 describes a risk analysis for determining a risk level of a vehicle. Safety risks may also exist in a vehicle that is free of electrical faults that are addressed by the ISO 26262. The ISO/PAS 21448 was set up and published for this purpose. The ISO/PAS 21448 addresses the safety of the setpoint function of the vehicle (SOTIF=Safety of the Intended Functionality) or safety risks that may result despite a fault-free operation of an electrical and/or electronic system of a vehicle. For instance, a vehicle steering system may incorrectly assess a detected driving situation in an environment of the vehicle so that a safety risk results for the vehicle. For example, a safety risk results when an object is not correctly detected (FN=false negative) or an object is erroneously detected despite not actually existing (FP=false positive). For instance, traffic accidents were published that involved highly automated driving systems which were exhaustively tested and in which the sensor systems and the control unit of the driving system as such showed no faults during the operation. Redundant sensor systems, for example, are employed in order to improve the highly automated driving systems or to make them more robust. The operation of a highly automated driving system based on redundant sensor systems increases the safety of the vehicle, but a misinterpretation of the redundant sensor data and/or an incorrect operation of the driving system may still occur, which means that a considerable residual risk remains for the safety of occupants and/or other involved road users. In addition, redundant sensor systems increase the cost of the driving system through higher unit costs, a greater integration expense and also greater testing and validation costs.

An object of the present invention is to improve a method for ascertaining the safety of a vehicle.

SUMMARY

The aforementioned object may be achieved by a method for ascertaining a safety level of a setpoint function of a vehicle according to an example embodiment of the present invention with the aid of a safety system according to an example embodiment of the present invention, and a vehicle according to an example embodiment of the present invention.

The present invention relates to a method for ascertaining a safety level of a setpoint function of a vehicle. In accordance with an example embodiment of the present invention, the method includes a detection of an environment of the vehicle and/or a state of the environment with the aid of at least one environment sensor. The environment sensor, for example, is a rain sensor, a light sensor, a camera and/or a distance sensor, in particular a liar sensor, an ultrasonic sensor and/or a radar sensor. At least multiple environment sensors using different detection technologies preferably detect the environment simultaneously. The at least one environment sensor generates a first sensor signal which represents the detected partial region of the environment and/or the detected state of the environment. In a further method step, a movement variable of the vehicle or an operating variable of the vehicle is detected with the aid of at least one movement sensor or an operating variable sensor. The at least one movement variable or operating variable, for example, includes a speed of the vehicle and/or a steering angle of the vehicle and/or a rotational speed of an axle in the drive system of the vehicle and/or a position of the vehicle. The movement sensor or operating variable sensor generates a second sensor signal which represents the detected movement variable or operating variable. Next, a safety system is activated, preferably optionally, as a function of the generated first sensor signal and the generated second sensor signal. In the next method step, the safety system ascertains a safety level of the setpoint function of the vehicle as a function of the generated first sensor signal and the generated second sensor signal. This ascertainment of the safety level is accomplished by comparing the first sensor signal and the second sensor signal with a database. The database includes a multitude of first and/or second sensor signals and/or first and/or second sensor signal data or sensor signal combinations which are assigned to a known safety level in each case. Alternatively or additionally, a trained machine detection method, in particular a neural network, carries out the ascertainment, the trained machine detection method in particular being trained as a function of the afire-described database. In other words, the trained machine detection method, in particular the neural network, advantageously ascertains a probability for a safety level of a current driving situation based on the first and second sensor signal. This ascertainment also makes it possible to detect safety levels of unknown driving situations in a reliable manner, for instance when the driving situation is similar to already known driving situations. In an advantageous manner, the ascertainment of the safety level is followed by at least one display of information for an occupant of the vehicle as a function of the ascertained safety level, the displayed information in particular being a warning. The present method advantageously allows for an ascertainment of a safety level as a function of a detected environment and/or a detected state of the environment and a detected movement of the vehicle. In other words, while the vehicle is in operation, the present method ascertains a safety level that relates to a current driving situation on the basis of current sensor data as well on the basis of empirical values from a database or by a trained machine detection method. The database represents empirical values from the past, which means that the database includes first and/or second sensor signal data that indicate the driving situations in which an automatic control is safe(r) or unsafe(r). The present method provides an anticipatory, semi-automatically or fully automatically guided or controlled vehicle. For instance, when rain is a detected state of the environment and a speed above a predefined limit is detected as the detected movement variable, a warning will be displayed to an occupant of the vehicle, the warning representing an ascertained reduced safety level of the driving operation. In another example the environment of the vehicle is detected with the aid of a camera, and objects in the camera image are detected using an image processing method. The object is another vehicle in the environment of the (ego) vehicle, for example. However, the image processing method functions less reliably at higher speeds under poor visibility conditions, which is why a warning will be displayed to an occupant of the vehicle above a predefined speed as a detected movement variable, the warning, for instance, representing a reduced safety level of the driving operation. The present method thus informs an occupant of the vehicle of an ascertained safety level, in particular a changed, safety level. The optional activation of the safety system advantageously takes place in order to save energy because a semi-automated or fully automated control of the vehicle is safe in the majority of operating situations. For example, the ascertained safety level or the safety of the setpoint function (SOTIF) of the vehicle makes it possible to identify or ascertain a predictable incorrect operation of the vehicle and/or a risky reaction by the driver and/or functional uncertainties in a timely and anticipatory manner. The semi-automated or fully automated control of the vehicle may advantageously be adapted to an ascertained possible risk potential or safety level.

In one example embodiment of the method of the present invention, prior to ascertaining the safety level of the setpoint function, an attention level of at least one occupant of the vehicle, in particular of a driver, is detected with the aid of an interior space sensor device. The interior space sensor device generates a third sensor signal, which represents the detected attention level of the occupant. Next, the optional activation of the safety system additionally takes place as a function of the generated third sensor signal. In this embodiment of the present method, the safety level of the setpoint function of the vehicle is additionally ascertained as a function of the generated third sensor signal. For instance, the interior space sensor device detects a hand of the driver on the steering wheel of the vehicle. In other words, the ascertained safety level of the setpoint function of the vehicle additionally is realized as a function of whether or not a driver has his or her hands on the steering wheel. It may be provided, for instance, that the safety level will be determined as critical when driving at a speed above a predefined limit is detected as the movement variable and when the driver does not have his hand on the steering wheel at night and/or when rain is present as the detected state of the environment. Alternatively or additionally, an interior space camera may be used to detect a viewing direction of the driver as an attention level of the occupant, for example.

In one preferred example embodiment of the method of the present invention, prior to ascertaining the safety level of the setpoint function, an incorrect operation of the vehicle is furthermore ascertained with the aid of at least one misuse sensor. The misuse sensor, for instance, detects an open door of the vehicle such as an open hatchback, and/or an incorrect setting of an operating state, e.g., a headlight of the vehicle being switched off during night driving. The misuse sensor generates a fourth sensor signal, which represents the detected incorrect operation of the vehicle. It may optionally be provided that the activation of the safety system be additionally implemented as a function of the generated fourth sensor signal. In this preferred embodiment, the safety level of the setpoint function of the vehicle is additionally ascertained as a function of the generated fourth sensor signal. This advantageously adapts an ascertained safety level to an incorrect operation of the vehicle. In this embodiment, for instance, the present method will ascertain a low safety level for a vehicle controlled in an automated manner if the headlights as the detected state of the environment are switched off during the night.

In a further refinement of the method of the present invention, prior to ascertaining the safety level of the setpoint function, an operativeness of the environment sensor, the interior space sensor device and/or the misuse sensor is carried out as a further step. Optionally, the safety system is additionally activated as a function of the ascertained operativeness of the environment sensor, the movement sensor, the interior space sensor device and/or the misuse sensor. In this further refinement, the safety level of the setpoint function of the vehicle is furthermore ascertained with the aid of the activated safety system as a function of the ascertained operativeness of the environment sensor, the movement sensor, the interior sensor and/or the misuse sensor. In the further refinement, the safety level is thus advantageously ascertained based on an operativeness of a sensor or a sensor device so that in the event of a technical defect, the safety level will be ascertained as a function of the defective sensor and the current driving situation of the vehicle. For instance, the ascertained safety level remains unchanged if a rear ultrasonic sensor on the vehicle malfunctions during travel on a superhighway provided the rear ultrasonic sensor is not used for the semi-automated or fully automated control of the vehicle at higher speeds on a superhighway.

The ascertainment of the safety level of the setpoint function is preferably carried out as a function of a change over time in the generated first sensor signal and the generated second sensor signal and/or as a function of a change over time in the generated third sensor signal and/or as a function of a change over time in the generated fourth sensor signal. At high acceleration values of the vehicle as the detected movement or operating variable, or at a sudden onset of heavy rain or a sudden overexposure of a frontal camera such as due to glare produced by oncoming traffic, the ascertainment of the safety level is therefore advantageously carried out in accordance with the thereby resulting risk potential. A sudden change in a detected sensor variable, in particular, may put the safety of the vehicle at risk, which is why it is advantageously taken into account in this particular embodiment.

In a further refinement of the present invention, a detection of at least one object in the environment of the vehicle is carried out with the aid of the control unit using a first object detection method as a function of the first sensor signal. The control unit generates a control unit signal based on the detected object. In addition, the ascertainment of the safety level of the setpoint function of the vehicle is subsequently performed as a function of another object detection method that differs from the first object detection method, the other object detection method in particular being limited to the partial region of the detected environment in which the object detected by the first object detection method is located. With the aid of this further refinement, the object detection is verified so that objects erroneously detected by the first object detection method (FP—false positive) are advantageously identified as such. In this further refinement, in particular also a partial region of the environment in which the first object detection method did not detect any objects and/or in which the first object detection method ascertained a vague probability result is able to be checked for objects.

In another further refinement of the method of the present invention, a control of the vehicle is adapted as a function of the ascertained safety level and/or the generated first sensor signal and/or the generated second sensor signal and/or as a function of the generated third sensor signal and/or as a function of the generated fourth sensor signal. The adaptation of the control advantageously controls a steering system of the vehicle, a brake system of the vehicle and/or a drive system of the vehicle and/or a driver information system of the vehicle. For instance, because of the adapted control, the speed of the vehicle is reduced as a function of the ascertained safety level with the aid of the brake system and/or with the aid of the drive system as a function of the ascertained safety level.

It may be provided that the adaptation of the control of the vehicle as a function of the ascertained safety level is a control that is carried out until a predefined minimum safety level has been reached. In this embodiment the vehicle thus is preferably transferred to an at least acceptable safety level by an adaptation of the control. For instance, the speed of the vehicle is reduced as a function of the intensity of a rain shower by adapting the control of the drive system. This embodiment advantageously provides a high safety level for the automated control of a vehicle.

Moreover, in a further refinement of the present invention, the adaptation of the control of the vehicle may additionally be performed as a function of predefined driving states. For instance, a safety level is ascertained and the vehicle controlled as a function of the ascertained safety level, and if the traffic is very heavy, a predefined speed will not be exceeded despite sufficient clearance from the vehicle traveling ahead. This embodiment offers the advantage of optimally adapting the safety of the occupants to the driving situation of the vehicle.

The present invention also relates to a safety system which is part of a control unit, in particular. As an alternative, the safety system is a component which is separate from the control unit. The safety system includes a computational unit. The computational unit is set up to carry out a method according to the present invention in order to ascertain a safety level of a setpoint function of a vehicle.

In addition, the present invention relates to a vehicle that is equipped with an environment sensor which is set up for detecting at least a partial region of an environment of the vehicle and/or a state of the environment. Moreover, the vehicle includes a movement sensor which is set up to detect at least one movement variable of the vehicle. The vehicle furthermore includes the safety system according to the present invention, in particular a control unit equipped with the safety system.

In a further refinement of the present invention, it may optionally be provided that the vehicle includes an interior space sensor device. The interior space sensor device is set up to detect at least an attention level of at least one occupant of the vehicle. Alternatively or additionally, the vehicle may advantageously include an optional misuse sensor, which is set up to detect an incorrect operation of the vehicle.

Additional advantages result from the following description of exemplary embodiments of the present invention with reference to the figures.

DETAILED DESCRIPTION OF EXAMPLE EMBODIMENTS

Figure 1:
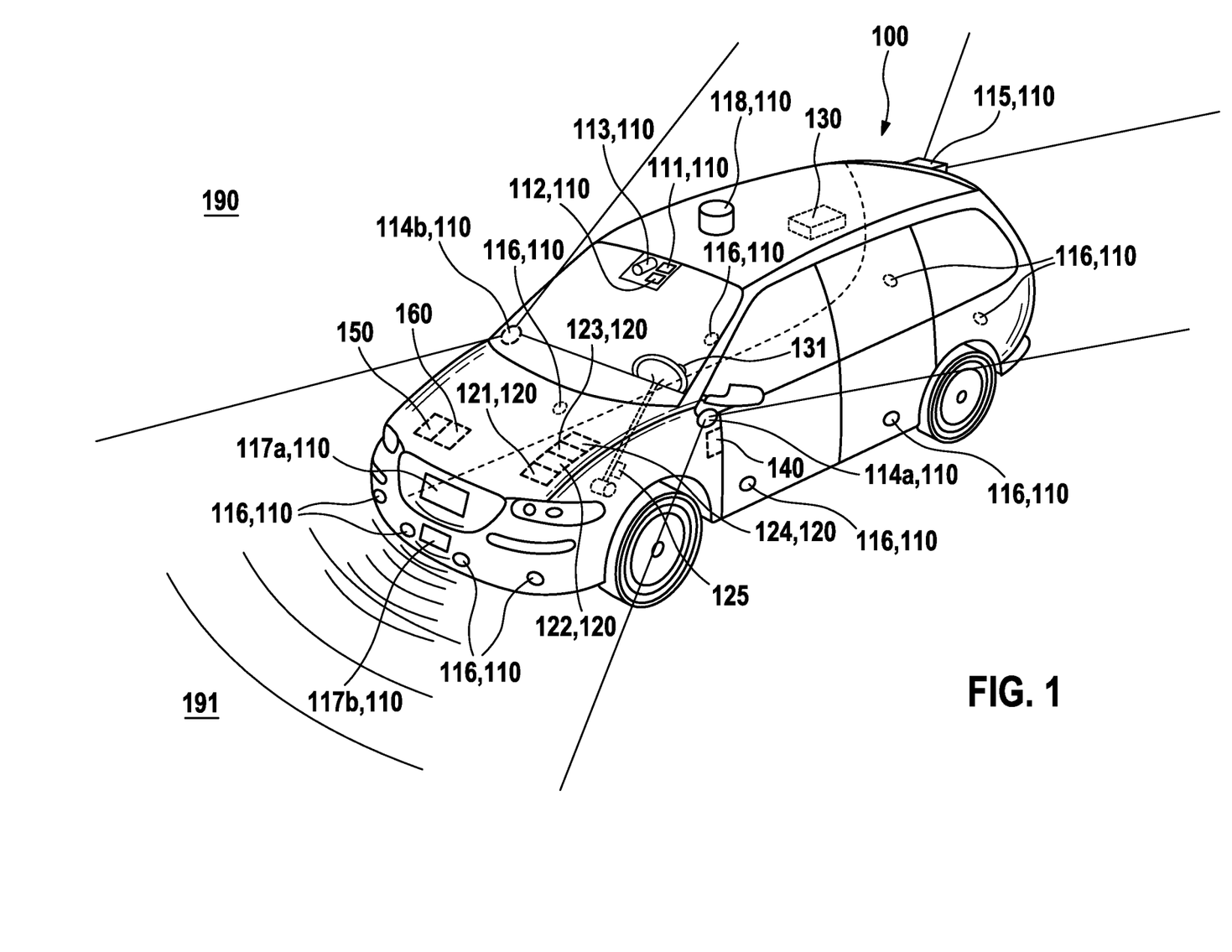
FIG. 1 shows a vehicle.

In FIG. 1, a vehicle 100 having a sensor system is schematically illustrated. The sensor system includes a multitude of environment sensors 110. In this particular exemplary embodiment, environment sensors 110 are a rain sensor 111, a light sensor 112, a front camera 113, side cameras 114a and 114b situated to the right and left, a rearward-pointing camera 115, ultrasonic sensors 116 situated in front and back along the sides, a radar 117a for the near region and a radar 117b for the far region and also a lidar sensor 118. The sensor system may include further sensor types, which are situated on vehicle 100. Environment sensors 110 of the sensor system are set up to detect at least a partial region of the environment of vehicle 190, in particular distance data and/or camera images, and/or a state of environment 190. The front camera detects partial region 191, for instance. The respective environment sensor 110, 111, 112, 113, 114a, 114b, 115, 116, 117a, 117b or 118 in each case generates a first sensor signal as a function of the detected partial region of the environment of vehicle 190 and/or the detected state of environment 190. Depending on the first sensor signals, which are generated with the aid of environment sensors 110 and represent the detected distance data and/or camera images and/or an environment state, a detection of objects and optionally at least a movement variable of the detected object and/or a movement trajectory of the detected object in environment 190 of vehicle 100 is carried out. The detected objects exhibiting the ascertained associated movement variables and/or the ascertained associated movement trajectories include error tolerances in each case and may have been detected and/or ascertained as faulty in particular as a function of the environment conditions and/or the operating state of vehicle 100. The detection 210 of the environment and/or of the state of the environment with the aid of respective environment sensor 111, 112, 113, 114a, 114b, 115, 116, 117a, 117b or 118 is optionally carried out as a function of an operating variable or a movement variable of vehicle 100. Rear-facing camera 115, for example, is in operation only when the vehicle is driving in reverse while in operation. Ultrasonic sensors 116 situated in front and back, for instance, may be in operation only at speeds of the vehicle below a predefined speed threshold value. In other words, the sensor system may detect the environment or the state of the environment as a function of an operating variable of vehicle 100. The sensor system of vehicle 100 furthermore includes at least one movement sensor 120 and/or at least one operating state parameter sensor. In this exemplary embodiment, a position sensor 121, in particular a sensor for a global satellite navigation system, a speed sensor 122, an acceleration sensor 123, an inertial measuring unit 124 and a steering angle sensor 125 are situated on vehicle 100 as movement sensors 120. Movement sensors 120 are designed to detect at least one movement variable of vehicle 100 or an operating state of vehicle 100 and to generate a second sensor signal as a function of the detected movement variable. For instance, the second sensor signal or the second sensor signals represent(s) coordinates of vehicle 100, a speed of vehicle 100, a steering angle of vehicle 100 and/or a yaw rate of vehicle 100.

In addition, the vehicle has an optional interior space sensor device 130, which is set up to detect at least one attention level of at least one occupant of vehicle 100. For example, interior space sensor device 130 is a contact sensor 131 on the steering wheel, which is set up to detect a hand on the steering wheel of vehicle 100 as the attention level. Interior space sensor device 130 is set up to generate a third sensor signal as a function of the detected attention level, which represents the detected attention level. An optional misuse sensor 140 may also be positioned on the vehicle and be set up to detect an incorrect operation of vehicle 100 and to generate a fourth sensor signal as a function of the detected incorrect operation. For instance, misuse sensor 140 is set up to detect an opening of a vehicle door or an activation of the headlight. In addition, vehicle 100 includes a control unit 150, which is set up to control vehicle 100 in a semi-automatic or fully automatic or an automated manner at least as a function of the generated first sensor signal and as a function of the generated second sensor signal and/or as a function of the generated third sensor signal and/or as a function of the generated fourth sensor signal. In particular, control unit 150 is set up to receive all sensor signals from the sensor system of vehicle 100 and to control the vehicle as a function of these sensor signals. Control unit 150 in particular controls a steering system of vehicle 100, a drive system of vehicle 100 and/or a brake system of vehicle 100 as a function of first, second, third and/or fourth sensor signals. Control unit 150 includes a safety system 160. As an alternative, safety system 160 is a component of vehicle 100 that is embodied separately from control unit 150. Safety system 160 is preferably set up to be activated as a function of a first sensor signal and/or a second sensor signal and/or a third sensor signal and/or a fourth sensor signal. For instance, the activation of safety system 160 is dependent on an exceeding of a threshold value amount for a respective first, second, third and/or fourth sensor signal, the threshold values preferably representing potentially dangerous driving situations. As an alternative, safety system 160 is able to monitor control unit 150 on a permanent basis while vehicle 100 is in operation and/or to ascertain a safety level of a setpoint function of vehicle 100 in an ongoing or uninterrupted manner. Safety system 160 is set up to monitor the control of vehicle 100 with the aid of control unit 150 by ascertaining the safety level of the setpoint function of vehicle 100 for a current driving situation. In other words, safety system 160 evaluates a safety level of an instantaneous driving situation of vehicle 100, the safety level in particular being ascertained as a function of an ego-movement of vehicle 100 and as a function of detected objects and their movement in the environment of vehicle 100. Safety system 160 is therefore set up to receive the generated first and second sensor signal of the sensor system, in particular all sensor signals of the sensor system of vehicle 100, and to ascertain the safety level of the setpoint function of vehicle 100 as a function of the sensor signals received from the sensor system. An occupant of vehicle 100, in particular the driver of vehicle 100, is warned, preferably by safety system 160, as a function of the sensor signals received from the sensor system. As an alternative or in addition, safety system 160 adapts the control of vehicle 100 with the aid of control unit 150 as a function of the ascertained safety level of the setpoint function and/or the first, second, third and/or fourth sensor signal. For instance, safety system 160 is designed to reduce the speed of vehicle 100 as a function of the ascertained safety level.

Figure 2:
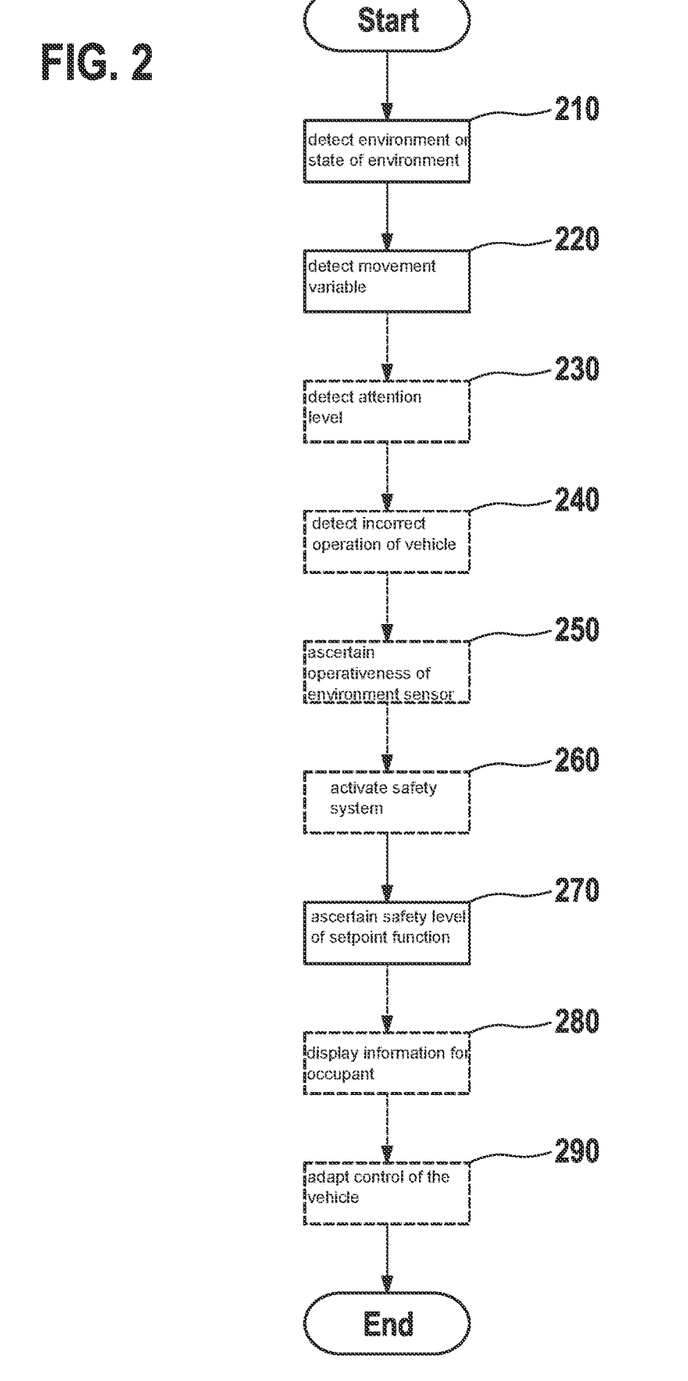
FIG. 2 shows A method for ascertaining a safety level of a setpoint function, in accordance with an example embodiment of the present invention.

FIG. 2 shows a flow diagram of the present method for ascertaining a safety level of a setpoint function in the form of a circuit diagram. To begin with, a detection 210 of at least a partial region of an environment 190 of vehicle 100 and/or a state of environment 190 takes place with the aid of at least one environment sensor 110. In step 210, environment sensor 110, 111, 112, 113, 114a, 114b, 115, 116, 117a, 117b or 118 generates a first sensor signal as a function of the detected partial region of the environment, which means that the first sensor signal represents the detected partial region of environment 190 and/or the detected state of environment 190. It may be provided that the first sensor signal additionally represents at least one detected object or one detected object class in the environment and/or a movement of the detected object in the environment of the vehicle. In addition, in step 220, a movement variable of the (ego) vehicle 100 is detected with the aid of at least one movement sensor 120, movement sensor 120 generating a second sensor signal as a function of the detected movement variable. The second sensor signal represents the detected movement variable. In a further step 230, an attention level of at least one occupant of vehicle 100 is optionally detected with the aid of interior space sensor device 130. Interior space sensor device 130 then generates a third sensor signal as a function of the detected attention level so that the third sensor signal represents the detected attention level of the occupant of the vehicle.

Next, in step 240, an incorrect operation of vehicle 100 is optionally detected with the aid of at least misuse sensor 140. The misuse sensor generates a fourth sensor signal as a function of the detected incorrect operation so that the fourth sensor signal represents the detected incorrect operation of the vehicle. In addition, it may be provided that an optional ascertainment 250 of an operativeness of at least an environment sensor 110, a movement sensor 120, the interior space sensor device 130 and/or a misuse sensor 140 is carried out. In another optional step 260, safety system 160 is activated as a function of the generated first sensor signal and/or the generated second sensor signal and/or the generated third sensor signal and/or the generated fourth sensor signal. In step 270, the safety level of the setpoint function of vehicle 100 is ascertained with the aid of safety system 160 at least as a function of the generated first sensor signal and the generated second sensor signal. Optionally, ascertainment 270 of the safety level of the setpoint function of vehicle 100 is additionally carried out as a function of the generated third sensor signal.

Moreover, optionally, ascertainment 270 of the safety level of the setpoint function of vehicle 100 is additionally performed as a function of the generated fourth sensor signal and/or as a function of the operativeness of at least one environment sensor 110 ascertained in step 250. For example, the safety level is determined as critical as a function of an operativeness ascertained in step 250 or as a function of a defective radar sensor ascertained in step 270.

Ascertainment 270 is preferably implemented by comparing the first sensor signal and the second sensor signal and/or the third sensor signal and/or the fourth sensor signal with a database. The database includes a multitude of first and second sensor signal data and/or third sensor signal data and/or fourth sensor signal data and/or first and second and/or third and/or fourth sensor signal data combinations, which are assigned to a known safety level in each case. It is especially preferred that ascertainment 270 of the safety level of the setpoint function of vehicle 100 by safety system 160 is trained using a trained machine detection method, in particular using a neural network, the trained machine detection method in particular being trained as a function of the afore-described database. The training of the trained machine detection method thus is performed by a database which includes a multitude of first, second, third and/or fourth sensor signal data and/or first, second, third and/or fourth sensor signal data combinations that are assigned to a known safety level in each case. Ascertainment 270 of the safety level of the setpoint function of vehicle 100 may optionally be carried out as a function of the operativeness of the environment sensor, the movement sensor, the interior space sensor device and/or the misuse sensor ascertained in step 250. In addition, it may be provided that ascertainment 270 of the safety level of the setpoint function of vehicle 100 is carried out as a function of a change over time in the generated first sensor signal and/or the generated second sensor signal and/or as a function of a change over time in the generated third sensor signal and/or as a function of a change over time in the generated fourth sensor signal. In a further optional step 280, a display of information for an occupant of vehicle 100 takes place as a function of the safety level ascertained in step 270. If the ascertained safety level is reduced in comparison with a previously ascertained safety level, the displayed information is a warning, in particular. It may furthermore be provided that a control of vehicle 100 in optional step 290 is adapted as a function of the ascertained safety level and/or the generated first sensor signal and/or the generated second sensor signal and/or as a function of the generated third sensor signal and/or as a function of the generated fourth sensor signal. Adaptation 290 of the control of vehicle 100 in particular adapts a steering angle of a steering system of vehicle 100, a brake pressure of a brake system of vehicle 100 and/or a torque of the drive system and/or a rotational speed of the drive system of vehicle 100. For instance, adaptation 290 of the control of vehicle 100 results in a lane change of vehicle 100 and a reduced speed of vehicle 100 as a function of an ascertained safety level. In an optional further development, adaptation 290 of the control of vehicle 100 is a control as a function of the ascertained safety level, which is carried out until a predefined minimum safety level is reached. In addition, adaptation 290 of the control of vehicle 100 takes place in particular as a function of predefined driving states. For example, driving states represent a certain combination of operating parameters of vehicle 100, which, for instance, are predefined for a safe control of the vehicle during heavy rain on a superhighway. Operating parameters are a maximum acceleration, a speed and/or the activation and/or deactivation of a passing maneuver, for example.

It may be provided that control unit 150 detects objects in environment 190 of vehicle 100 as a function of the at least one first sensor signal in step 265 (not shown in FIG. 2). Optionally, in step 265, the control unit additionally ascertains a movement of the detected object and/or a movement trajectory of the detected object. Based on object detection 265, the control unit generates a control unit signal in step 266 as a function of the at least one detected object. The generated control unit signal which, for example, represents at least one detected object in environment 190 of vehicle 100 and optionally also a movement of the detected object and/or a movement trajectory of the detected object, is transmitted to the safety system. Alternatively, in addition to detected environment 190, in particular, the first sensor signal generated based on detected environment 190 may represent at least one detected object in environment 190 of vehicle 100 and optionally also a movement of the detected object and/or optionally a movement trajectory of the detected object. In this particular embodiment, a first object detection thus takes place with the aid of control unit 150 or, in step 210, additionally as a function of environment 190 detected with the aid of at least one environment sensor 110. In this preferred optional embodiment, ascertainment 270 of the safety level with the aid of safety system 160 is set up to check the control unit signal and/or the first sensor signal or the first object detection of step 210 or step 265. In other words, step 270 has the technical effect that a verification of an object in environment 190 of vehicle 100, detected in step 210 or in step 265, for a possible faulty detection is carried out, for instance because the object does not really exist in the environment (FP=false positive), and/or because the object corresponds to an object class other than an ascertained object class. Preferably, the technical effect also ensues that a verification (FN=false negative) of a probability of an object is carried out that the first object detection method possibly did not detect in environment 190 of vehicle 100. To this end, ascertainment 270 may be performed as a function of another detection algorithm or another object detection method in comparison with the first object detection. Ascertainment 270 is optionally carried out as a function of the detected object represented by the first sensor signal, and/or as a function of the position and/or movement of the detected object in the environment represented by the first sensor signal and/or by the control unit signal, ascertainment 270 preferably being restricted to a partial region of an environment in which a detected object represented by the first sensor signal and/or the control unit signal is located and/or in which vehicle 100 is at risk of a collision and/or in which a probability of an object detection is vaguer than usual, for instance because a probability of another object in the method for the first object detection exceeds a threshold value. The partial region of the environment preferably checked for an object in step 270 is checked for an object with the aid of a different detection algorithm than in the first object detection. In other words, ascertainment 270 is optionally and additionally carried out as a function of a method for an object detection that differs from the first object detection. Furthermore, ascertainment 270 of the safety level is preferably realized by comparing the results of the other method for an object detection with the result of the first object detection, or in other words, ascertainment 270 takes place as a function of a detected object that is represented by the control unit signal and/or the first sensor signal.

The invention claimed is:

1. A method for ascertaining a safety level of a setpoint function of a vehicle, the method comprising the following steps:
   detecting, using at least one environment sensor, an environment of the vehicle and/or a state of the environment, the environment sensor generating a first sensor signal which represents the detected partial region of the environment and/or the detected state of the environment;
   detecting a movement variable of the vehicle using at least one movement sensor, the movement sensor generating a second sensor signal which represents the detected movement variable;
   ascertaining, using a safety system, the safety level of the setpoint function of the vehicle as a function of the generated first sensor signal and the generated second sensor signal:
      i. by comparing the first sensor signal and the second sensor signal with a database including a multitude of first and second sensor signal data and/or first and second sensor signal data combinations, which are each assigned to a known safety level, and
      ii. by a trained machine learning detection method, the trained machine learning method being trained as a function of the database, wherein the trained machine detection method ascertains, while the vehicle is in operation, a probability for the safety level of a current driving situation based on the first and second sensor signal and the database, and
   controlling the vehicle by applying steering, braking, and or toque based on the ascertained safety level;
   detecting at least one object in the environment of the vehicle using the control unit as a function of the first sensor signal by a first object detection method;
   generating a control unit signal as a function of the detected object; and
   ascertaining the safety level of the setpoint function of the vehicle additionally as a function of another object detection method that differs from the first object detection method, the other object detection method being restricted to a partial region of the detected environment in which the first object detected by the first detection method is positioned,
   wherein the another object detection method verifies the first detection by identifying false positives such that objects erroneously detected by the first object detection method are identified.

2. The method as recited in claim 1, wherein the machine learning detection method is a neural network.

3. The method as recited in claim 1, further comprising the following step prior to ascertaining the safety level of the setpoint function:
   activating the safety system as a function of the generated first sensor signal and/or the generated second sensor signal.

4. The method as recited in claim 1, the method further comprising the following steps prior to ascertaining the safety level of the setpoint function:
   detecting an attention level of at least one occupant of the vehicle using an interior space sensor device, the interior space sensor device generating a third sensor signal which represents the detected attention level of the occupant; and
   ascertaining the safety level of the setpoint function of the vehicle additionally as a function of the generated third sensor signal.

5. The method as recited in claim 4, the method further comprising the following steps prior to ascertaining the safety level of the setpoint function:
   detecting an incorrect operation of the vehicle using at least one misuse sensor, the misuse sensor generating a fourth sensor signal which represents the detected incorrect operation of the vehicle; and
   ascertaining the safety level of the setpoint function of the vehicle additionally as a function of the generated fourth sensor signal.

6. The method as recited in claim 5, wherein the ascertainment of the safety level of the setpoint function of the vehicle is carried out as a function of a change over time in the generated first sensor signal and the generated second sensor signal and/or as a function of a change over time in the generated third sensor signal and/or as a function of a change over time in the generated fourth sensor signal.

7. The method as recited in claim 5, further comprising the following step:
   adapting a control of the vehicle as a function of the ascertained safety level and the generated first sensor signal and/or the generated second sensor signal and/or as a function of the generated third sensor signal and/or as a function of the generated fourth sensor signal, the control being a control of a steering system of the vehicle and/or a brake system of the vehicle and/or a drive system of the vehicle and/or a driver information system of the vehicle.

8. The method as recited in claim 1, further comprising the following steps prior to ascertaining the safety level of the setpoint function:
   ascertaining an operativeness of the environment sensor and/or the movement sensor and/or an interior space sensor device and/or a misuse sensor; and
   ascertaining the safety level of the setpoint function of the vehicle additionally as a function of the ascertained operativeness of the environment sensor and/or the movement sensor and/or the interior space sensor device and/or the misuse sensor.

9. The method as recited in claim 1, further comprising the following step:
   displaying information for an occupant of the vehicle as a function of the ascertained safety level, wherein the information includes a warning.

10. The method as recited in claim 1, further comprising the following step:
    adapting a control of the vehicle as a function of the ascertained safety level and the generated first sensor signal and/or the generated second sensor signal, the control being a control of a steering system of the vehicle and/or a brake system of the vehicle and/or a drive system of the vehicle and/or a driver information system of the vehicle.

11. The method as recited in claim 10, wherein the adaptation of the control of the vehicle as a function of the ascertained safety level is a control that is carried out until a predefined minimum safety level has been reached.

12. The method as recited in claim 11, wherein the adaptation of the control of the vehicle is additionally performed as a function of predefined driving states.

13. A non-transitory computer-readable medium on which is stored a computer program for ascertaining a safety level of a setpoint function of a vehicle, the computer program, when executed by a computer, causing the computer to perform the following steps:
- detecting, using at least one environment sensor, an environment of the vehicle and/or a state of the environment, the environment sensor generating a first sensor signal which represents the detected partial region of the environment and/or the detected state of the environment;
- detecting a movement variable of the vehicle using at least one movement sensor, the movement sensor generating a second sensor signal which represents the detected movement variable; and
- ascertaining, using a safety system, the safety level of the setpoint function of the vehicle as a function of the generated first sensor signal and the generated second sensor signal:
  - i. by comparing the first sensor signal and the second sensor signal with a database including a multitude of first and second sensor signal data and/or first and second sensor signal data combinations, which are each assigned to a known safety level, or
  - ii. by a trained machine learning detection method, the trained machine learning method being trained as a function of the database, wherein the trained machine detection method ascertains, while the vehicle is in operation, a probability for the safety level of a current driving situation based on the first and second sensor signal and the database, and
- controlling the vehicle by applying steering, braking, and or toque based on the ascertained safety level;
- detecting at least one object in the environment of the vehicle using the control unit as a function of the first sensor signal by a first object detection method;
- generating a control unit signal as a function of the detected object; and
- ascertaining the safety level of the setpoint function of the vehicle additionally as a function of another object detection method that differs from the first object detection method, the other object detection method being restricted to a partial region of the detected environment in which the first object detected by the first detection method is positioned,
- wherein the another object detection method verifies the first detection by identifying false positives such that objects erroneously detected by the first object detection method are identified.

14. A safety system for monitoring a control unit of a vehicle, the safety system including a computation unit configured to ascertain a safety level of a setpoint function of a vehicle, the computation unit configured to:
- detect, using at least one environment sensor, an environment of the vehicle and/or a state of the environment, the environment sensor generating a first sensor signal which represents the detected partial region of the environment and/or the detected state of the environment;
- detect a movement variable of the vehicle using at least one movement sensor, the movement sensor generating a second sensor signal which represents the detected movement variable; and
- ascertain, using the safety system, the safety level of the setpoint function of the vehicle as a function of the generated first sensor signal and the generated second sensor signal:
  - i. by comparing the first sensor signal and the second sensor signal with a database including a multitude of first and second sensor signal data and/or first and second sensor signal data combinations, which are each assigned to a known safety level, or
  - ii. by a trained machine learning detection method, the trained machine learning method being trained as a function of the database, wherein the trained machine detection method ascertains, while the vehicle is in operation, a probability for the safety level of a current driving situation based on the first and second sensor signal and the database, and
- controlling the vehicle by applying steering, braking, and or toque based on the ascertained safety level;
- detecting at least one object in the environment of the vehicle using the control unit as a function of the first sensor signal by a first object detection method;
- generating a control unit signal as a function of the detected object; and
- ascertaining the safety level of the setpoint function of the vehicle additionally as a function of another object detection method that differs from the first object detection method, the other object detection method being restricted to a partial region of the detected environment in which the first object detected by the first detection method is positioned,
- wherein the another object detection method verifies the first detection by identifying false positives such that objects erroneously detected by the first object detection method are identified.

15. A vehicle, comprising:
- an environment sensor configured to detect at least a partial region of an environment of the vehicle and/or a state of the environment;
- a movement sensor configured to detect at least one movement variable of the vehicle; and
- a safety system configured to ascertain a safety level of a setpoint function of the vehicle, the safety system configured to:
  - detect, using the environment sensor, the environment of the vehicle and/or the state of the environment, the environment sensor generating a first sensor signal which represents the detected partial region of the environment and/or the detected state of the environment;
  - detect the movement variable of the vehicle using the movement sensor, the movement sensor generating a second sensor signal which represents the detected movement variable; and
  - ascertain, using the safety system, the safety level of the setpoint function of the vehicle as a function of the generated first sensor signal and the generated second sensor signal:
    - i. by comparing the first sensor signal and the second sensor signal with a database including a multitude of first and second sensor signal data and/or first and second sensor signal data combinations, which are each assigned to a known safety level, or
    - ii. by a trained machine learning detection method, the trained machine learning method being trained as a function of the database, wherein the trained machine detection method ascertains, while the vehicle is in operation, a probability for the safety level of a current driving situation based on the first and second sensor signal and the database, and
  - controlling the vehicle by applying steering, braking, and or toque based on the ascertained safety level;

detecting at least one object in the environment of the vehicle using the control unit as a function of the first sensor signal by a first object detection method;

generating a control unit signal as a function of the detected object; and ascertaining the safety level of the setpoint function of the vehicle additionally as a function of another object detection method that differs from the first object detection method, the other object detection method being restricted to a partial region of the detected environment in which the first object detected by the first detection method is positioned, wherein the another object detection method verifies the first detection by identifying false positives such that objects erroneously detected by the first object detection method are identified.

16. A vehicle as recited in claim 15, further comprising:

an interior space sensor device configured to detect at least one attention level of at least one occupant of the vehicle, and/or a misuse sensor configured to detect an incorrect operation of the vehicle.

\* \* \* \* \*